United States Patent
Savary et al.

(10) Patent No.: US 11,867,401 B2
(45) Date of Patent: Jan. 9, 2024

(54) PRE-VAPORIZING PIPE, COMBUSTION ASSEMBLY PROVIDED THEREWITH AND TURBOMACHINE PROVIDED THEREWITH

(71) Applicant: SAFRAN HELICOPTER ENGINES, Bordes (FR)

(72) Inventors: Nicolas Roland Guy Savary, Moissy-Cramayel (FR); Claude Marie Michel Berat, Moissy-Cramayel (FR); Olivier Lamaison, Moissy-Cramayel (FR); Yvan Ludovic Lameignere, Moissy-Cramayel (FR); Hubert Pascal Verdier, Moisy-Cramayel (FR); Chritophe Nicolas Henri Viguier, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 78 days.

(21) Appl. No.: 17/613,861

(22) PCT Filed: May 25, 2020

(86) PCT No.: PCT/EP2020/064456
§ 371 (c)(1),
(2) Date: Nov. 23, 2021

(87) PCT Pub. No.: WO2020/239702
PCT Pub. Date: Dec. 3, 2020

(65) Prior Publication Data
US 2022/0235937 A1     Jul. 28, 2022

(30) Foreign Application Priority Data
May 28, 2019    (FR) ...................................... 1905637

(51) Int. Cl.
*F23R 3/32* (2006.01)
*F02C 7/22* (2006.01)
*F23R 3/30* (2006.01)

(52) U.S. Cl.
CPC .................. *F23R 3/32* (2013.01); *F02C 7/22* (2013.01); *F23R 3/30* (2013.01)

(58) Field of Classification Search
CPC .... F23R 3/30; F23R 3/32; F23D 11/44; F23D 11/005; F23D 11/441; F23C 2700/026
See application file for complete search history.

(56) References Cited

U.S. PATENT DOCUMENTS

| | | | | |
|---|---|---|---|---|
| 3,820,324 | A * | 6/1974 | Grindley et al. | ......... F23R 3/04 60/738 |
| 2015/0060403 | A1* | 3/2015 | Carter | ..................... C23C 10/30 216/102 |

FOREIGN PATENT DOCUMENTS

| CN | 108397790 A | 8/2018 |
|---|---|---|
| FR | 1 104 809 A | 11/1955 |

(Continued)

OTHER PUBLICATIONS

International Search Report for PCT/EP2020/064456 dated Aug. 5, 2020 [PCT/ISA/210].

(Continued)

*Primary Examiner* — Gerald L Sung
(74) *Attorney, Agent, or Firm* — Sughrue Mion, PLLC (57) ABSTRACT

The invention relates to a pre-vaporizing pipe (5) for a combustion chamber of a turbomachine, comprising a generally elongate main body (50), comprising a first end portion (51) delimiting an inlet duct (52) in which a fuel injector is to be mounted, the body (50) having an external surface (500) having a first length (L1) that extends from the portion (51) to at least one first fuel outlet end piece (53), and a second length (L2) that extends the first length (L1)

(Continued)

from the end piece (53) and that extends from the end piece (53) to a second fuel outlet end piece (54). According to the invention, inside the body (50) there is a first channel (55) connecting the duct (52) to the end piece (53) and a second channel (56) which is distinct from the first channel (55) and which connects the duct (52) to the end piece (54).

16 Claims, 5 Drawing Sheets

(56) References Cited

FOREIGN PATENT DOCUMENTS

| FR | 3066009 A1 | 11/2018 |
|---|---|---|
| GB | 824306 A | 11/1959 |
| WO | 2015/054140 A1 | 4/2015 |
| WO | 2015/079166 A1 | 6/2015 |

OTHER PUBLICATIONS

Written Opinion for PCT/EP2020/064456 dated Aug. 5, 2020 [PCT/ISA/237].

* cited by examiner

PRE-VAPORIZING PIPE, COMBUSTION ASSEMBLY PROVIDED THEREWITH AND TURBOMACHINE PROVIDED THEREWITH

CROSS REFERENCE TO RELATED APPLICATIONS

This application is a National Stage of International Application No. PCT/EP2020/064456 filed May 25, 2020, claiming priority based on French Patent Application No. 1905637 filed May 28, 2019, the entire contents of each of which being herein incorporated by reference in their entireties.

The invention relates to a pre-vaporization rod for a turbomachine combustion chamber, a combustion chamber provided with this vaporization rod and a turbomachine provided with this combustion chamber.

The rod is usually attached to a casing in order to enter the combustion chamber via an opening thereof.

Such rods are known, for example, from documents FR-A-3 066 009 and WO 2015/079166.

The pre-vaporization rod known from document FR-A-3 066 009 comprises a main body of generally elongated shape and defining a first inner longitudinal duct in which a fuel injector is intended to be mounted, said main body comprising a first longitudinal end for attachment to a chamber wall and a second longitudinal end, and two bent arms disposed at the second longitudinal end and defining bent end pieces whose first ends are in fluid communication with said first duct and whose second ends are intended to open out into the chamber.

The drawback of this rod is that the bent arms generate lateral space requirement making it more difficult to withdraw the rod by passing it through the opening of the chamber.

Figure 1:
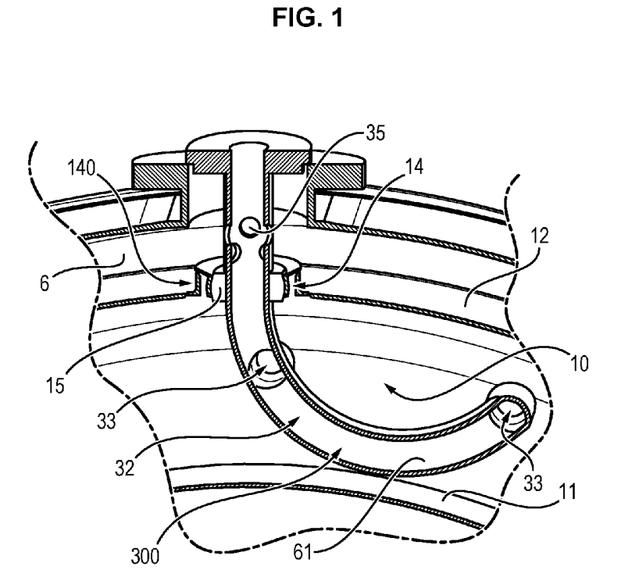
FIG. 1 schematically represents an example of a pre-vaporization rod according to document WO 2015/079166.

Document WO 2015/079166 describes a pre-vaporization rod according to FIG. 1, which comprises a tubular wall 61 forming a duct 32 extending inside the combustion chamber 10, and opening out thereinto through two end pieces 33 connected to different locations of the length of the wall 61 located at a distance from a fuel injector inserted into one end of the duct. This rod, because of the fact that the end pieces are in series, makes it easier to slide the rod into the opening of the chamber to withdraw it.

On the other hand, the fuel flows expelled by the two end pieces according to FIG. 1 are too asymmetrical, which means that the combustions in the chamber at the outlet of the two end pieces are also asymmetrical.

The invention aims at obtaining a pre-vaporization rod for a turbomachine combustion chamber, which can at the same time be easily dismounted by sliding out of the opening of the combustion chamber and which allows better monitoring the fuel flows from the end pieces.

To this end, a first subject matter of the invention is a pre-vaporization rod for a combustion chamber of a turbomachine, comprising a main body of generally elongated shape, the main body comprising a first end portion delimiting an inlet duct in which a fuel injector is intended to be mounted, the main body having an external surface having at least a first length extending from the end portion to at least a first fuel outlet end piece, and at least a second length, which extends the first length from the first fuel outlet end piece and which extends from the first fuel outlet end piece to at least a second fuel outlet end piece, characterized in that inside the main body is at least a first channel connecting the inlet duct to the first fuel outlet end piece and at least a second channel, which is separate from the first channel and which connects the inlet duct to the second fuel outlet end piece.

Thanks to the invention, the arrangement of the first channel can be determined independently of the arrangement of the second channel, in order to be able to create in the first and second end pieces respectively two first and second fuel flows having characteristics more similar to each other.

According to one embodiment of the invention, the external surface of the body comprises a main arm extending generally along a first longitudinal direction and a lateral arm connected to the main arm and deviating in a curved manner along a second direction, which is lateral relative to the first longitudinal direction, the main arm connects the end portion to the first fuel outlet end piece, and
the second fuel outlet end piece is located in the lateral arm, at a distance from the main arm and at a distance from the first fuel outlet end piece.

According to one embodiment of the invention, the first the fuel outlet end piece and the second fuel outlet end piece are oriented in the same orientation of a same third fuel outlet direction.

According to one embodiment of the invention, the first length is taken along the shortest line of the external surface from the end portion to a first central portion of the first fuel outlet end piece, the second length is taken along the shortest line of the external surface from the first central portion of the first fuel outlet end piece to a second central portion of the second fuel outlet end piece.

According to one embodiment of the invention, the first channel has a first internal fuel passage length which is greater than the first length.

According to one embodiment of the invention, the first internal fuel passage length of the first channel is taken along a line, which is central relative to a first internal surface of the main body delimiting the first channel.

According to one embodiment of the invention, a first portion of a first internal fuel passage length of the first channel is located inside the second length of the external surface of the main body.

According to one embodiment of the invention, the first channel comprises a second portion, which is bent relative to a third portion of the first channel, connected to the second portion of the first channel.

According to one embodiment of the invention, the first channel comprises at least one bend located inside the second length of the external surface of the main body and between the third portion of the first channel and the second portion of the first channel.

According to one embodiment of the invention, the first channel adjoins a portion of the second channel inside the main body on the first length and on a fourth portion of the second length.

According to one embodiment of the invention, the first channel, the first fuel outlet end piece, the second channel and the second fuel outlet end piece are delimited by at least one internal wall of the main body and by the external surface of the main body, the external surface being in one single piece with the at least one internal wall.

According to one embodiment of the invention, the main body is a part made by additive manufacturing.

According to one embodiment of the invention, the pre-vaporization rod further comprises means for introducing air into the inlet duct.

According to one embodiment of the invention, the first channel is delimited by a first internal surface of the main body, the second channel is delimited by a second internal surface of the main body, the first internal surface of the main body has a first area which is equal, by within less than 10%, to a second area of the second internal surface of the main body.

A second subject matter of the invention is a turbomachine combustion assembly, comprising
- a casing,
- a fuel combustion chamber disposed in the casing,
- at least one pre-vaporization rod as described above, whose first end portion is mounted on the casing and whose main body enters the combustion chamber through an opening made in a wall of the combustion chamber, the first fuel outlet end piece and the second fuel outlet end piece being located in the combustion chamber,
- a fuel injector being mounted in the inlet duct of the pre-vaporization rod.

A third subject matter of the invention is a turbomachine comprising a combustion assembly as described above.

The invention will be better understood upon reading the following description, given only by way of non-limiting example with reference to the figures of the appended drawings.

The pre-vaporization rod 5 or stick and the combustion assembly 1 according to the invention can be mounted on a turbomachine.

Figure 3:
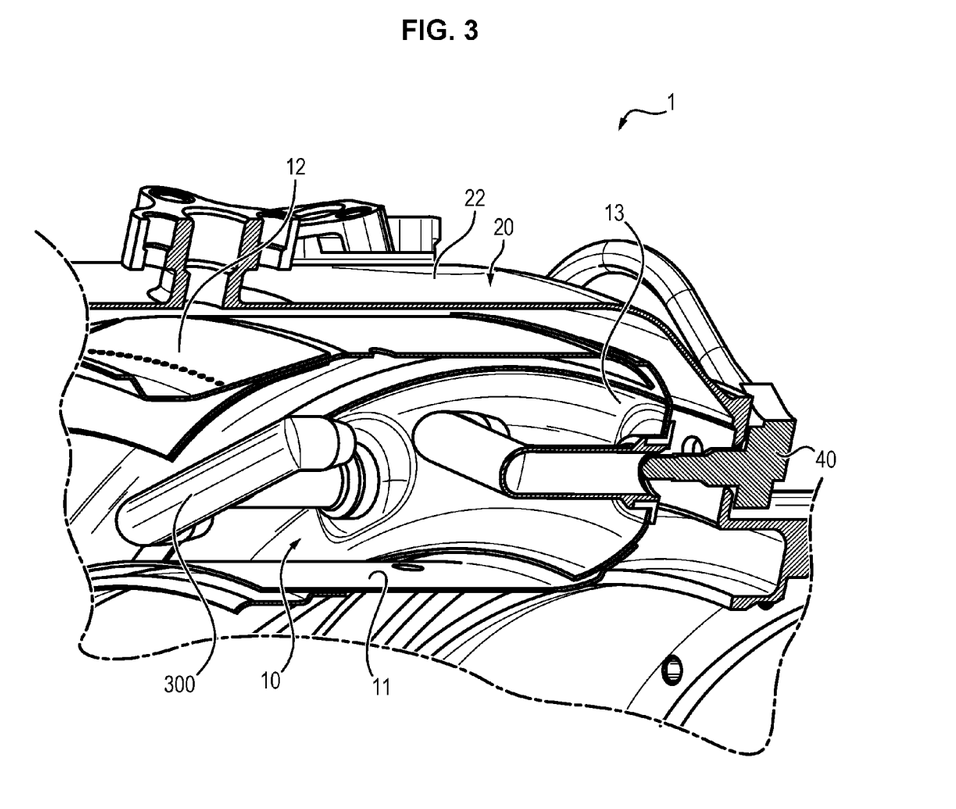
FIG. 3 schematically represents in perspective a combustion assembly, in which the pre-vaporization rod according to the invention can be used.
Figure 4:
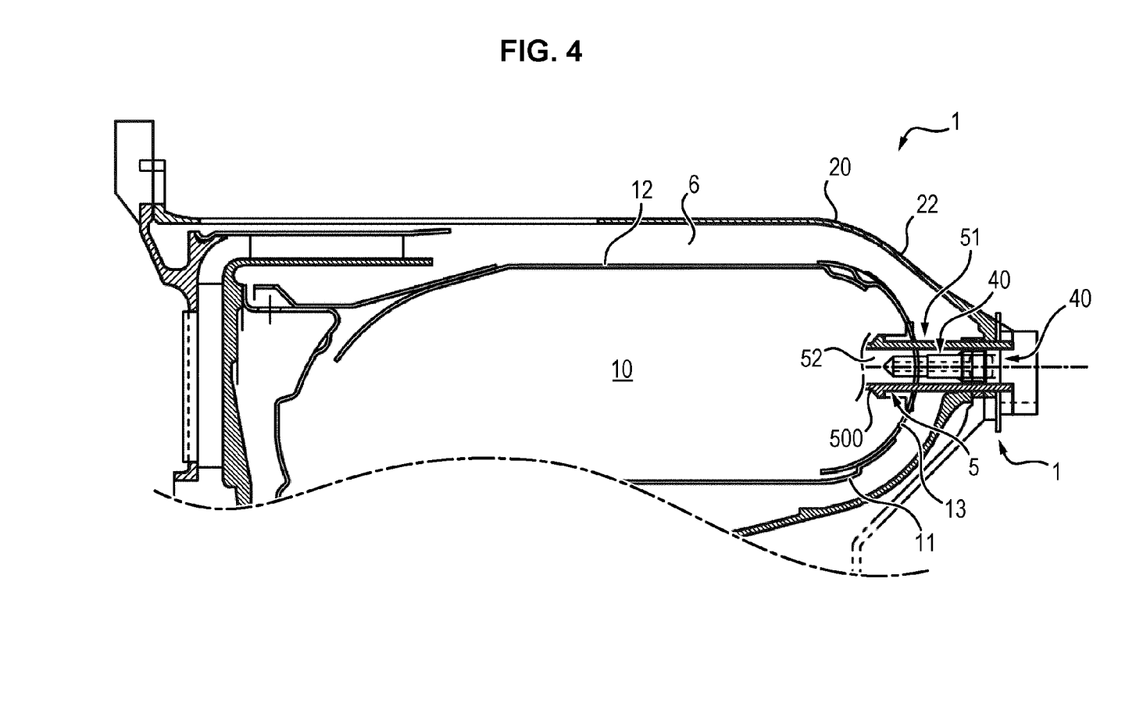
FIG. 4 schematically represents in partial section a combustion assembly, in which the pre-vaporization rod according to the invention can be used and in which it has been partially represented.

Referring to FIGS. 1, 3 and 4, the combustion assembly 1 comprises a casing 20, in which the combustion chamber 10 is disposed. The combustion chamber 10 may for example comprise two respectively inner 11 and outer 12 revolution walls extending one inside the other, and connected by a chamber bottom 10 annular wall 13. The casing 20 may also comprise an outer wall of revolution 22, called outer shroud, extending around the combustion chamber 10, and to which the outer wall 12 thereof is attached.

The combustion assembly 1 further comprises one or several pre-vaporization rods 5. Examples of vaporization rods 300 according to document WO 2015/079166 are represented in FIGS. 1 and 3.

One or several vaporization rods 5 according to the invention can be mounted in the combustion assembly 1 of FIGS. 3 and 4, where they are not represented. The pre-vaporization rod(s) 5 is/are mounted on the casing 20 and/or on a wall of the combustion chamber 10. The vaporization rod(s) 5 according to the invention can be dismounted. The pre-vaporization rod is itself attached to the combustion chamber 10, at the outer wall or at the chamber bottom wall thereof, and enters the combustion chamber 10 through an opening 14 made in the wall.

Figure 2:
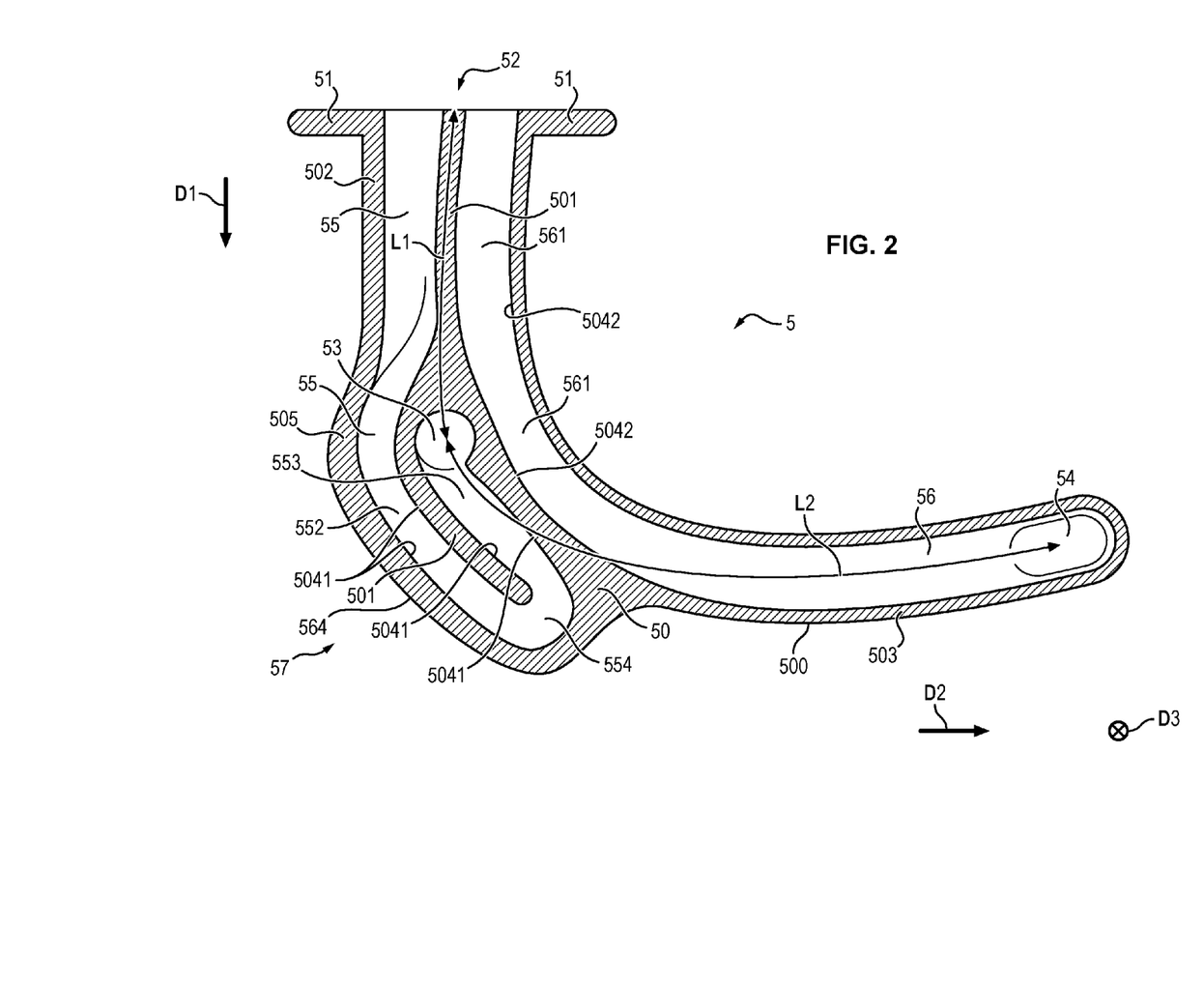
FIG. 2 schematically represents in longitudinal section a pre-vaporization rod according to one embodiment of the invention.
Figure 5:
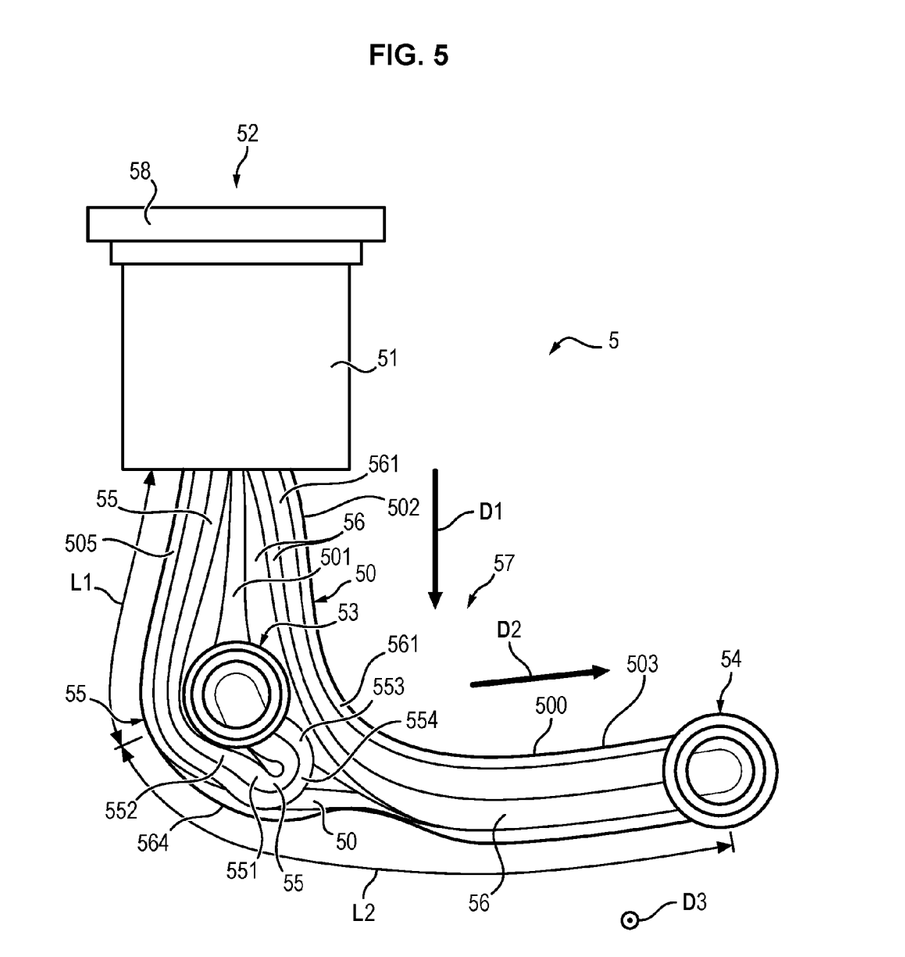
FIG. 5 schematically represents an inside view of a pre-vaporization rod according to another embodiment of the invention.

In FIGS. 2 and 5, the pre-vaporization rod 5 according to the invention comprises a main body 50 extending in a curved manner in length. The main body 50 comprises a first end portion 51 delimiting an inlet duct 52 in which a fuel injector 40 is intended to be mounted, as represented in FIG. 4, for sending fuel into the rod 5. The end portion 51 can for example be rectilinear in length. Air also enters through the duct 52.

The first end portion 51 is connected to a fluid conveying section 57, described below, for sending fuel. The fluid conveying section 57 of the main body 50 of the rod 5 may be for example curved in length. The external surface 500 of the body 50 of the rod 5 comprises a main arm 502 extending generally along (and/or around) a first longitudinal direction D1 and a lateral arm 503 connected to the main arm 502 and deviating in a curved manner along a second lateral direction D2 (which may for example be towards the right in FIGS. 2 and 5) of the first longitudinal direction D1. The lateral arm 503 is bent relative to the main arm 502. The second lateral direction D2 can be perpendicular to the first longitudinal direction D1. In other embodiments, the second lateral direction D2 can make an angle smaller than 90° or greater than 90° relative to the first longitudinal direction D1.

According to one embodiment, the main arm 502 connects the end portion 51 to the first fuel outlet end piece 53, and the second fuel outlet end piece 54 is located in the lateral arm 503, at a distance from the main arm 502 and at a distance from the first fuel outlet end piece 53.

According to one embodiment, the first fuel outlet end piece 53, and the second fuel outlet end piece 54 are oriented in the same orientation of the same third fuel outlet direction D3. For example, in FIGS. 2 and 5, the third fuel outlet direction D3 is transverse or perpendicular relative to the main arm 502 and/or relative to the lateral arm 503 and/or relative to the first longitudinal direction D1 and/or relative to the second lateral direction D2.

The fluid conveying section 57 has an external wall 505 having an external surface 500. The external surface 500 of the main body 50 has a first non-zero length L1 from the end portion 51 to a first fuel outlet end piece 53. The external surface 500 of the main body 50 of the rod 5 has a second non-zero length L2, which extends the first length L1 from the first fuel outlet end piece 53. The second length L2 extends from the first fuel outlet end piece 53 to a second fuel outlet end piece 54, distant from the first fuel outlet end piece 53.

The lengths are curvilinear. The first length L1 can be for example taken along the shortest line of the external surface 500 from the end portion 51 to a first central portion of the first fuel outlet end piece 53. The second length L2 can be for example taken along the shortest line of the external surface 500 from the first central portion of the first fuel outlet end piece 53 to a second central portion of the second fuel outlet end piece 54. In FIGS. 2 and 5, these lengths L1 and L2 are represented on the external side of the rod 5 so as not to overload the figures.

The fluid conveying section 57 of the main body 50 comprises a first channel 55 connecting the inlet duct 52 to the first fuel outlet end piece 53. The first channel 55 is hollow for sending fuel and air from the inlet duct 52 to the first end piece 53. The fluid conveying section 57 of the main body 50 comprises a second channel 56, which is separate from the first channel 55 and which connects the inlet duct 52 to the second fuel outlet end piece 54. The second channel 56 is hollow for sending fuel and air from the inlet duct 52 to the second end piece 54. The first channel 55 and the second channel 56 communicate with each other only through the inlet duct 52, for example with a plenum thereof. The first channel 55 and the second channel 56 are delimited inside the main body 50. Of course, more than two channels and more than two end pieces can be provided. The channel 55 and/or 56 may meander inside the main body 50. The first channel 55 is thus a first channel 55 for sending fuel and air. The first end piece 53 is thus a first fuel and air outlet end piece 53. The second channel 56 is thus a second fuel and air sending channel 56. The second end piece 54 is thus a second fuel and air outlet end piece 54.

Thanks to the channels 55 and 56, it is possible to better monitor at the outlet of the first and second end pieces respectively two first and second fuel flows more similar to each other, which facilitates their effective integration into the turbomachine 2. By playing on the channels 55 and 56, it is thus possible to guarantee the same functional, and particularly the same vaporization at the outlet of the end pieces 53 and 54 of the rod 5, and thus iso-functional end pieces 53 and 54. It is thus possible to obtain a better symmetry of the vaporization in the end pieces 53 and 54 and a better homogeneity of the combustion in the chamber 10. Particularly, the invention can obtain an equivalence of the end pieces 53 and 54 in terms of performances in air permeability, residence time, wet surface, flow rate at the outlet of the end pieces 53 and 54, fraction of fuel evaporated at the outlet of the end pieces 53 and 54. The invention can thus reduce the functional deviations, thus limiting the risks and the costs associated with such a modification, which moreover allows significant maintenance gains. The invention can thus obtain an equivalence of the combustion at the outlet of the end pieces 53 and 54.

Characteristics of arrangement of the channels 55 and 56 are described in the embodiments below.

According to one embodiment represented in FIGS. 2 and 5, the external wall 505 is connected to one or several internal walls 501, which delimit the first channel 55 and the second channel 56. According to one embodiment represented in FIGS. 2 and 5, the external wall 505 is in one integral piece with the internal wall(s) 501.

According to one embodiment represented in FIGS. 2 and 5, the first channel 55 is delimited by a first internal surface 5041 of the main body 50. The first internal surface 5041 is carried in part by the external wall 505 and in part by the internal wall(s) 501.

According to one embodiment represented in FIGS. 2 and 5, the second channel 55 is delimited by a second internal surface 5042 of the main body 50. The second internal surface 5042 is carried in part by the external wall 505 and in part by the internal wall(s) 501.

According to one embodiment represented in FIGS. 2 and 5, the first channel 55 has a first internal fuel passage length, which is greater than the first length L1. Thus, the first channel 55 can be curved around the first length L1 in order to travel through a longer path than that of the external surface 500 from the edge of the inlet duct 52 to the edge of the first end piece 53. It is thus possible to better bring the length and/or the volume of the first channel 55 closer to the length and/or the volume of the second channel 56, which allows obtaining more similar fuel flows in the first and second end pieces 53 and 54. The first internal fuel passage length of the first channel 55 may be taken along a line, which is located in the first channel 55 and which is surrounded by the first internal surface 5041 of the main body 50 delimiting the first channel 55 or is central relative to the first internal surface 5041 of the main body 50 delimiting the first channel 55.

The second internal fuel passage length of the second channel 56 may be taken along a line, which is located in the second channel 56 and which is surrounded by the second internal surface 5042 of the main body 50 delimiting the second channel 56 or is central relative to the second internal surface 5042 of the main body 50 delimiting the second channel 56.

According to one embodiment represented in FIGS. 2 and 5, a first portion 551 of the first internal fuel passage length of the first channel 55 is located inside the second length L2 of the external surface 500 of the main body 50. The first channel 55 is thus lengthened, which allows obtaining more similar fuel flows in the first and second end pieces 53 and 54.

According to one embodiment represented in FIGS. 2 and 5, a second portion 552 (of the first internal fuel passage length) of the first channel 55 is bent or folded along one or several bends 554 relative to a third portion 553 (of the first internal fuel passage length) of the first channel 55, the third portion 553 being connected to the second portion 552. The bend(s) 554 of the first channel between the third portion 553 of the first channel and the second portion 552 of the first channel may be for example located inside the second length L2 of the external surface 500 of the main body 50, that is to say in the first portion 551 of the first channel. It is thus possible to place more internal length of the first channel 55 in a reduced space. In this way, more symmetry between the internal lengths and volumes of the channels 55 and 56 is achieved.

According to one embodiment represented in FIGS. 2 and 5, the first channel 55 adjoins (that is to say is located next to, by being separated therefrom by at least one internal wall 501 of the main body 50) a portion 561 of the second channel 56 inside the main body 50 on the first length L1 and on a fourth portion 564 of the second length L2.

According to one embodiment represented in FIGS. 2 and 5, the first channel 55, the first fuel outlet end piece 53, the second channel 56 and the second fuel outlet end piece 54 are delimited by one or several internal walls 501 of the main body 50 and by the external surface 500 of the main body 50. The external surface 500 of the main body 50 is in one single piece with the internal wall(s) 501 of the main body 50. Thus, a further reduced external width of the rod 5 is obtained while having more similar fuel flows at the outlet of the end pieces 53 and 54 and a more reduced weight of the rod 5.

According to one embodiment, the first area of the first internal fuel passage surface 5041 of the first channel 55 is substantially equal, or equal by within less than 10%, to the second area of the second internal fuel passage surface 5042 of the second channel 56 and/or the first internal volume of the first channel 55 is substantially equal, or equal by within less than 10%, to the second internal volume of the second channel 56 and/or the first internal fuel passage length of the first channel 55 is substantially equal, or equal by within less than 10%, to the second internal fuel passage length of the second channel 56.

According to one embodiment, the first flow rate/pressure characteristic of the first channel 55 is substantially equal, or equal by within less than 10%, to the second flow rate/pressure characteristic of the second channel 56.

According to one embodiment represented in FIGS. 2 and 5, the main body 50 is a part made by additive manufacturing. This makes it easier to achieve the internal curvatures of the channels.

According to one embodiment represented in FIGS. 2 and 5, the pre-vaporization rod 5 comprises means for introducing air into the inlet duct 52. These air introduction means may comprise in the inlet duct 52 one or several orifices 35 and/or ducts 6, serving for the introduction of air, whose non-limiting examples are represented in FIGS. 1 and 4.

According to one embodiment, the first end portion 51 of the pre-vaporization rod(s) 5 according to the invention is mounted on the casing 20. In this mounting position, the main body 50 of the rod 5 enters the combustion chamber 10 through an opening 14 present in a wall of the combustion chamber 10. In this mounting position, the first fuel outlet end piece 53 and the second fuel outlet end piece 54 are located in the combustion chamber 10. In this mounting position, a fuel injector 40 is mounted in the inlet duct 52 of each pre-vaporization rod 5, as shown in FIG. 4 (this element having been omitted in FIGS. 2 and 5). The first end portion 51 may be located outside the combustion chamber 10.

One mode of operation of the combustion assembly 1 comprising the pre-vaporization rod 5 according to the invention is described below.

The fuel injector 40 opens out into the inlet duct 52 to inject fuel therein. The main injector 40 injects fuel once the combustion within the chamber 10 has already been initiated by another type of injector called "starting injector". The fuel is projected by the injector 40 into the inlet duct 52 of the rod 5, which rod 5 is heated by the combustion taking place in the combustion chamber 10. In contact with the walls of the rod 5, the fuel vaporizes and mixes with air coming from one or several orifices 35 made in the wall 31 of the rod, between the outer shroud 22 of the casing 20 and the outer wall 12 of the combustion chamber. One example of disposition of orifices 35 passing through the wall of the inlet duct 52 of the rod 5 has been represented in FIG. 1.

The air-fuel mixture enters the combustion chamber 10 through the end pieces 53 and 54 of the pre-vaporization rod 5. The fuel-air mixture ignites in the combustion chamber 10 when it exits the end pieces 53 and 54 of the rod 5. The end pieces 53 and 54 can be oriented towards the bottom wall 13 of the chamber 10, allowing a good combustion of the injected fuel.

Each pre-vaporization rod 5 can be mounted on the outer shroud 22 of the casing 20, and enters inside the combustion chamber 10 through the opening 14 made in the outer wall 12 thereof. The end 58 of the end portion 51, away from the fluid conveying section 57 of each pre-vaporization rod 5 can be mounted on the outer side of the outer shroud 22 of the casing 20. To dismount the pre-vaporization rod 5, it can be slid into the opening 14 to be withdrawn therefrom. This allows accessing the pre-vaporization rod 5, for example to repair or replace it, from the outside of the casing 20, without having to dismount this casing 20 or the combustion chamber 10.

The pre-vaporization 30 rod 5 can enter inside the casing 20 by means of another opening 24 made in its outer shroud 22, the opening 24 being preferably facing the opening 14 of the wall of the combustion chamber 10, to facilitate the insertion and withdrawal of the pre-vaporization rod 5, whose inlet duct 32 generally extends in a rectilinear manner.

Each pre-vaporization rod 30 can be removably mounted on the casing 20 and/or on the wall of the combustion chamber 10, for example by bolting or screwing. This makes it easy to remove a rod to replace, repair or clean it.

The combustion assembly 1 may further comprise a sealing ring 50, adapted to ensure the sealing of the combustion chamber 10 at the opening 14 and allowing the passage of the pre-vaporization rod 5 in the combustion chamber 10. The sealing ring 15 can be disposed between an edge 140 of the opening 14 and the external surface 500 of the rod 5. The ring 15 ensures the sealing of the wall 12, while authorizing it to be deformed by thermal expansion during the operation of the turbomachine 2.

Of course, the embodiments, characteristics, possibilities and examples described above can be combined with each other or be selected independently of each other.

The invention claimed is:

1. A pre-vaporization rod for a fuel combustion chamber of a turbomachine, the pre-vaporization rod comprising a main body of elongated shape, the main body comprising a first end portion delimiting an inlet duct in which a fuel injector is intended to be mounted, the main body having an external surface having at least a first length extending from the first end portion to at least a first fuel outlet end piece, and at least a second length, which extends the first length from the first fuel outlet end piece and which extends from the first fuel outlet end piece to at least a second fuel outlet end piece, wherein inside the main body is at least a first channel connecting the inlet duct to the first fuel outlet end piece and at least a second channel, which is separate from the first channel and which connects the inlet duct to the second fuel outlet end piece, wherein the first channel has a first internal fuel passage length which is greater than the first length.

2. The pre-vaporization rod according to claim 1, wherein the external surface of the body comprises a main arm extending along a first longitudinal direction and a lateral arm connected to the main arm and deviating in a curved manner along a second direction, which is lateral relative to the first longitudinal direction, the main arm connects the first end portion to the first fuel outlet end piece, and the second fuel outlet end piece is located in the lateral arm, at a first distance from the main arm and at a second distance from the first fuel outlet end piece.

3. The pre-vaporization rod according to claim 1, wherein the first fuel outlet end piece and the second fuel outlet end piece are oriented in the same orientation of a same third fuel outlet direction.

4. The pre-vaporization rod according to claim 1, wherein a first portion of the first internal fuel passage length of the first channel is located inside the second length of the external surface of the main body.

5. The pre-vaporization rod according to claim 1, wherein the first channel comprises a second portion, which is bent relative to a third portion of the first channel, connected to the second portion of the first channel.

6. The pre-vaporization rod according to claim 5, wherein the first channel comprises at least one bend located inside the second length of the external surface of the main body and between the third portion of the first channel and the second portion of the first channel.

7. The pre-vaporization rod according to claim 1, wherein the first channel adjoins a portion of the second channel inside the main body on the first length and on a fourth portion of the second length.

8. The pre-vaporization rod according to claim 1, wherein the first channel, the first fuel outlet end piece, the second channel and the second fuel outlet end piece are delimited by at least one internal wall of the main body and by the external surface of the main body, the external surface being in one single piece with the at least one internal wall.

9. The pre-vaporization rod according to claim 1, wherein the main body is a part made by additive manufacturing.

10. The pre-vaporization rod according to claim 1, further comprising at least one orifice for introducing air into the inlet duct.

11. The pre-vaporization rod according to claim 1, wherein the first channel is delimited by a first internal surface of the main body, the second channel is delimited by a second internal surface of the main body,
the first internal surface of the main body has a first area which is equal, by within less than 10%, to a second area of the second internal surface of the main body.

12. A turbomachine combustion assembly comprising
a casing,
a fuel combustion chamber disposed in the casing,
at least one pre-vaporization rod according to claim 1, whose first end portion is mounted on the casing and whose main body enters the fuel combustion chamber through an opening made in a wall of the fuel combustion chamber, the first fuel outlet end piece and the second fuel outlet end piece being located in the fuel combustion chamber, and
a fuel injector being mounted in the inlet duct of the pre-vaporization rod.

13. A turbomachine comprising a turbomachine combustion assembly according to claim 12.

14. The pre-vaporization rod according to claim 1, wherein the first length is in series with the second length.

15. The pre-vaporization rod according to claim 1, wherein:
the first length is taken along a first shortest line of the external surface from the first end portion to a first central portion of the first fuel outlet end piece, and
the second length is taken along a second shortest line of the external surface from the first central portion of the first fuel outlet end piece to a second central portion of the second fuel outlet end piece.

16. A pre-vaporization rod for a fuel combustion chamber of a turbomachine, comprising a main body of elongated shape, the main body comprising a first end portion delimiting an inlet duct in which a fuel injector is intended to be mounted,
the main body having an external surface having at least a first length extending from the first end portion to at least a first fuel outlet end piece, and at least a second length, which extends the first length from the first fuel outlet end piece and which extends from the first fuel outlet end piece to at least a second fuel outlet end piece,
wherein inside the main body is at least a first channel connecting the inlet duct to the first fuel outlet end piece and at least a second channel, which is separate from the first channel and which connects the inlet duct to the second fuel outlet end piece,
wherein the first channel is delimited by a first internal surface of the main body, the second channel is delimited by a second internal surface of the main body, and
the first internal surface of the main body has a first area which is equal, by within less than 10%, to a second area of the second internal surface of the main body.

* * * * *